June 30, 1925.
O. W. HILBERT
1,543,770
GLASS BATCH
Filed Jan. 15, 1921
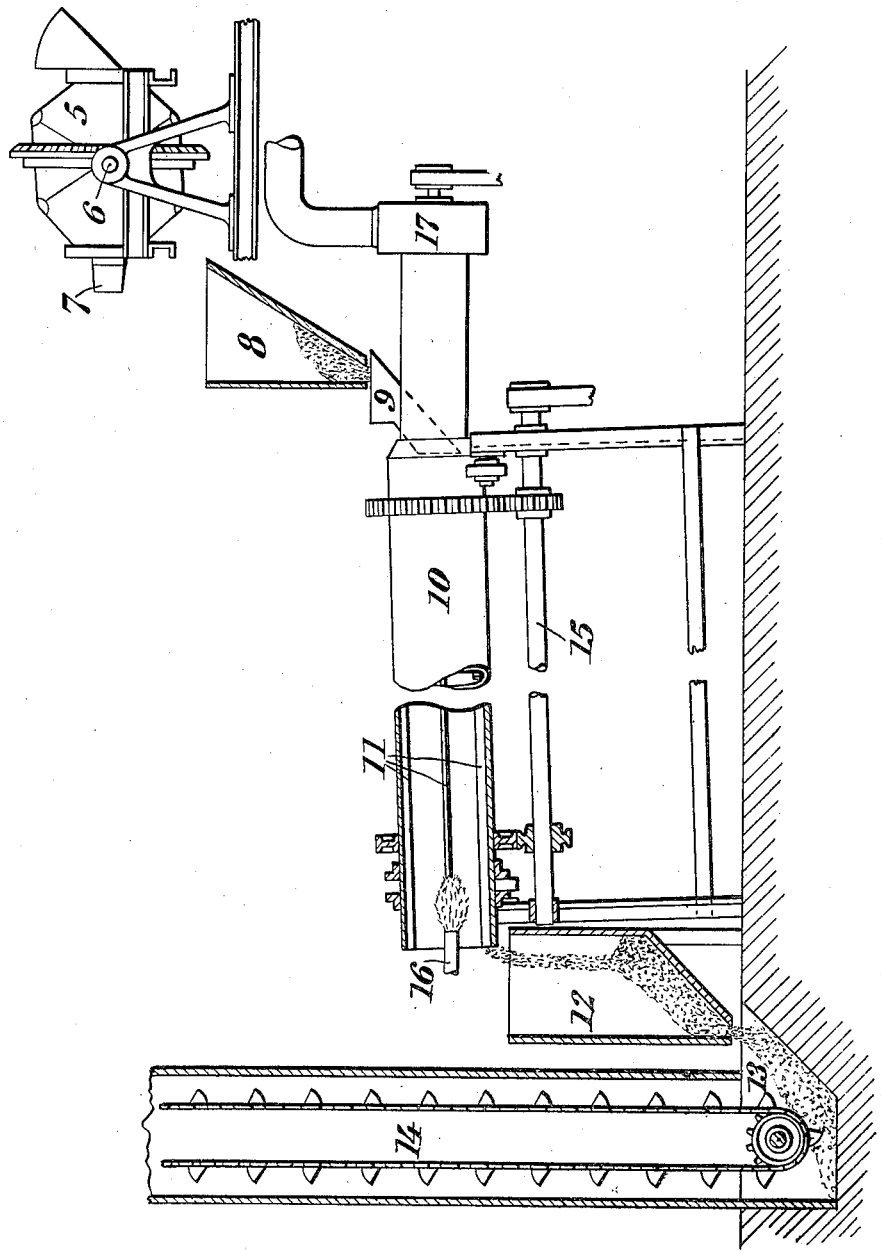
Otto W. Hilbert,
INVENTOR
BY
ATTORNEY Patented June 30, 1925.

1,543,770

UNITED STATES PATENT OFFICE.

OTTO W. HILBERT, OF CORNING, NEW YORK, ASSIGNOR TO CORNING GLASS WORKS, OF CORNING, NEW YORK, A CORPORATION OF NEW YORK.

GLASS BATCH.

Application filed January 15, 1921. Serial No. 437,451.

*To all whom it may concern:*

Be it known that I, OTTO W. HILBERT, a citizen of the United States of America, and a resident of Corning, New York, have invented certain new and useful Improvements in Glass Batches, of which the following is a specification.

The raw materials from which glass is made contain silica, in the form of sand; and one or more alkalis, such as salt cake, or the like. These ingredients are generally prepared in the form of a fine powder, and they are mixed in predetermined proportions to form the batch, a mix of which may weigh a hundred or more pounds or even several tons.

The constituents of each batch, as it is made up, have different specific gravities; and when stored, or while being conveyed, the materials forming the batch have a tendency to segregate, in an amount depending on their specific gravities. Therefore, when the batch is being shovelled into a pot or melting tank furnace, or being discharged through an opening into a container or bin, or being conveyed on belts from one part of the factory to another, due to its nature, the materials separate. This causes the lighter portions to become separated from the silica and other portions, with the result, that proper melting is difficult, and the desired uniform composition of the glass is not obtained, and this is increased by the lighter constituents of the batch being carried off up the furnace stack.

In order to prevent the materials of a glass batch from unmixing or separating, and the loss as above stated, as has heretofore occurred, I propose to bind the several ingredients together during the mixing operation, so that they will be retained in mixed condition while the batch is being delivered to a pot or tank for melting, and the losses of the lighter portions in melting be avoided.

I have made the discovery, that if a certain amount of moisture is present in the batch, and after the several ingredients thereof are properly intermingled, they be subjected to heat in a manner to cause an uniform evaporation of the moisture, that all of the minute particles forming the batch will be united to form granules, each of which will be composed of the several ingredients, mixed in proper proportion.

In actual practice, any suitable apparatus can be employed to form the granules, but I have, however, in the accompanying drawing, shown a diagrammatic view of an apparatus capable of preparing glass batches in accordance with my invention.

The raw materials, after being weighed in the correct proportions, are dumped into a mixer 5, that is continuously rotated by suitable means. The mixer is preferably located in an elevated position above the floor of the mixing room, and the materials are delivered thereto from the floor above. When the several materials have been thoroughly intermingled by the mixer, the latter is tilted on its pivot 6, so that the materials will discharge through a spout 7, into a bin 8.

The bin 8, has an opening formed in its bottom, whereby the mixed materials will feed by gravity through a delivery spout 9, into one end of a rotary shell 10.

The shell 10 is cylindrical in form, and may be of any desired length. It is mounted with its longitudinal axis inclined slightly to the horizontal, the end receiving the materials of the batch being higher than the end through which the materials are discharged. Both ends of the shell are open. The interior wall of the shell is provided with a plurality of baffles 11, which are disposed longitudinally thereof, and whose purpose is to maintain the materials in a thoroughly agitated condition during the operation of the apparatus.

The shell is mounted for continuous rotary movement. It is connected by gearing to a shaft 15, that is driven from a motor, or other means (not shown).

Projecting into the discharge end of the shell, is a burner 16, that emits a flame sufficient to maintain the required amount of temperature within the shell. To the opposite end of the shell, is placed a fan 17, whose purpose is to draw the waste gases from the burner 16 through the shell. There is a slight back draft in the shell, due to the fan, but this draft is not strong enough to hinder the passage of the materials towards the discharge end of the shell, or to mechanically carry any of the ingredients.

At the discharge end of the shell is a bin 12, into which the material falls. This bin is positioned over a hopper 13, that has mounted therein, the lower end of an elevator 14. If so desired, the elevator may be dispensed with, and the material withdrawn from the bin 12 as needed.

The mixed materials, upon entering the shell 10, from the bin 9, are maintained substantially suspended, due to the action of the baffles 11. During each revolution of the shell, they are fed forwardly towards the discharge end of the shell, and in so doing, are gradually heated, as the burner maintains a rather high temperature in this end of the shell.

The following is given as an example of a batch formula for boro-silicate glass that can be formed into granules in accordance with my invention:—

| | | Per cent |
|---|---|---|
| $SiO_2$ | sand | 69 |
| $Na_2B_4O_7.10H_2O$ | borax | 20 |
| $H_3BO_3$ | boric acid | 6 |
| $NaNO_3$ | nitre | |
| $As_2O_3$ | arsenic | 5 |
| $Al_2(OH)_6$ | alumina | |

This batch contains about 10% moisture, which is in the form of water of crystallization present in the borax. When this batch has been mixed in the manner previously described, and is delivered from the bin 8, to the shell 10, the first effect of the heat within the shell, will be to increase the amount of free water present by driving out some of the moisture, either as water of crystallization or as absorbed water. The batch here becomes sticky, and as it continues its feeding movement through the heated zone and the temperature rises, the water is evaporated, leaving the batch in the form of small hardened granules, the particles of which are sufficiently bound together to prevent separation of the constituents, the granules being formed under the agitation caused by the baffles of the shell. A convenient size for these granules is slightly larger than the grains of granulated sugar.

Providing there is not sufficient moisture contained naturally in the boro-silicate batches, the formation of the granules can be obtained by increasing the heat within the shell to about 800° C., when the borax will be fritted, and the ingredients formed into a sticky mass that will harden as it is fed through the shell, and which will be broken into granules under the agitation caused by the baffles.

In treating a batch having ingredients in which there is practically no moisture, such for instance, as the batch formula for lime glass given below:—

| | | Per cent |
|---|---|---|
| $SiO_2$ | sand | 60 |
| $Na_2CO_3$ | soda | 30 |
| $NaNO_3$ | nitre | |
| $Ca(OH)_2,Mg(OH)_2$ | lime-magnesia | 10 |
| $Al_2(OH)_6$ | alumina | | it is desirable that the batch be moistened by adding about 10% water thereto while the ingredients are in the mixer, so that when the batch is fed into the shell, the heat therein will drive out the moisture, and in so doing will cause the formation of granules in the manner previously described.

In either case, the operation of the apparatus is similar, and the temperature maintained therein the same. This temperature, which is controlled by the size of the flame from the burner 16, is preferably about 100° C. at the upper end (intake) of the shell, and from 400° C. to 500° C. adjacent to the burner 16, in the opposite end thereof.

Upon being formed into granules, no one constituent of the batch will be lost, due to handling or storing, because the several ingredients of which each are composed, are bound fast together. It will be understood, that while I have herein, described the method of preparing two specific batches for glass, my invention can equally as well be used for preparing all other batches in the same manner.

Having thus described my invention what I claim as new is:—

1. The method of preparing a glass batch containing several raw materials that have been mixed together in predetermined proportions, which consists in forming the mixed materials into small granules.

2. The method of preparing a batch of raw materials for use in making glass which consists in mixing the materials in the correct proportions, and then forming the materials into small granules, the granules being formed by subjecting the mixed materials to sufficient heat to form small granules.

3. The method of preparing a batch of raw materials for use in making glass which consists in mixing the materials, the said materials containing a small amount of moisture, and then subjecting them to sufficient heat to form small granules when the moisture therein is evaporated.

4. The method of preparing a batch of raw materials for use in making glass which consists in mixing the materials, and then subjecting them to heat of sufficient intensity to cause the raw materials to be partially fritted to form small granules.

5. The method of preparing a glass batch from raw materials that are in the form of a fine powder, which consists in thoroughly mixing the materials, and then subjecting the mixture to heat of sufficient intensity to form the materials into small granules, each of which is composed of the desired proportions of raw materials.

6. A batch of raw materials for use in making glass, composed of small granules, each containing the ingredients of the batch of the desired proportions.

7. A glass batch composed of small granules each of which is formed with the desired proportion of raw materials.

8. A glass batch composed of small granules each of which contains the desired proportion of ingredients.

9. A batch of raw materials adapted to be melted into glass, consisting of the materials formed into small granules, each of which is composed of the desired proportions of raw materials.

10. A glass batch having all its raw materials formed into small granules of like composition.

In testimony whereof I hereunto sign my name this 13 day of January 1921.

OTTO W. HILBERT.